United States Patent
Dong et al.

(10) Patent No.: US 9,971,079 B2
(45) Date of Patent: May 15, 2018

(54) BACKLIGHT MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ruijun Dong, Beijing (CN); Haiwei Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 221 days.

(21) Appl. No.: 14/387,049

(22) PCT Filed: Aug. 15, 2013

(86) PCT No.: PCT/CN2013/081533
§ 371 (c)(1),
(2) Date: Sep. 22, 2014

(87) PCT Pub. No.: WO2014/183346
PCT Pub. Date: Nov. 20, 2014

(65) Prior Publication Data
US 2016/0223735 A1    Aug. 4, 2016

(30) Foreign Application Priority Data
May 13, 2013    (CN) .......................... 2013 1 0175791

(51) Int. Cl.
F21V 7/04    (2006.01)
F21V 8/00    (2006.01)
(Continued)

(52) U.S. Cl.
CPC ........... *G02B 6/0026* (2013.01); *G02B 6/002* (2013.01); *G02B 6/0023* (2013.01);
(Continued)

(58) Field of Classification Search
CPC .... G02B 6/0026; G02B 6/002; G02B 6/0023; G02F 1/37; G02F 2203/11; G02F 1/133603; G02F 2001/133614; G02F 2201/11
(Continued)

(56) References Cited

U.S. PATENT DOCUMENTS 6,637,905 B1 * 10/2003 Ng ....................... G02B 6/0026
362/601
7,905,613 B2 * 3/2011 Watanabe ............ G02B 6/0028
362/23.08
(Continued)

FOREIGN PATENT DOCUMENTS

CN    201600532 U    10/2010
CN    201773244 U    3/2011
(Continued)

OTHER PUBLICATIONS

First Chinese Office Action Appln. No. 201310175791.7; dated Feb. 11, 2015.
(Continued)

*Primary Examiner* — Elmito Breval
*Assistant Examiner* — Jessica M Apenteng
(74) *Attorney, Agent, or Firm* — Ladas & Parry LLP (57) ABSTRACT

A backlight module and a display device are provided. The backlight module includes a light conversion unit and a light source, wherein the light conversion unit and the light source are provided in a same layer, and the light conversion unit is configured to convert infrared light generated due to reflection of light from the light source into visible light. The
(Continued)

backlight module of the present invention has an improved lighting effect.

20 Claims, 6 Drawing Sheets

(51) Int. Cl.
  *G02F 1/1335* (2006.01)
  *G02F 1/37* (2006.01)
(52) U.S. Cl.
  CPC .......... *G02F 1/133603* (2013.01); *G02F 1/37* (2013.01); *G02F 2001/133614* (2013.01); *G02F 2203/11* (2013.01)
(58) Field of Classification Search
  USPC .......................... 362/608, 84, 97.3, 230–235
  See application file for complete search history.

(56) References Cited

U.S. PATENT DOCUMENTS

| | | | | |
|---|---|---|---|---|
| 2003/0095401 A1* | 5/2003 | Hanson | ................ | G02B 6/0038 362/84 |
| 2005/0270775 A1 | 12/2005 | Harbers et al. | | |
| 2008/0259975 A1* | 10/2008 | Kamijima | ........... | H01S 5/02296 372/23 |
| 2013/0083260 A1* | 4/2013 | Minami | .................... | F21S 8/00 349/15 |
| 2013/0214300 A1* | 8/2013 | Lerman | ............... | H01L 25/0753 257/88 |

FOREIGN PATENT DOCUMENTS

| | | |
|---|---|---|
| CN | 102866535 A | 1/2013 |
| JP | 2006-119240 A | 5/2006 |

OTHER PUBLICATIONS

International Search Report dated Jan. 15, 2014; PCT/CN2013/081533.

Written Opinion of the International Searching Authority dated Feb. 10, 2014; PCT/CN2013/081533.

\* cited by examiner

Figure 5 ical field

Embodiments of the present invention relate to a backlight module and a display device.

BACKGROUND

A backlight module is a light source arranged behind a panel of a liquid crystal display, the lighting effect of which directly affects the visual effect of a liquid crystal display module.

Figure 1:
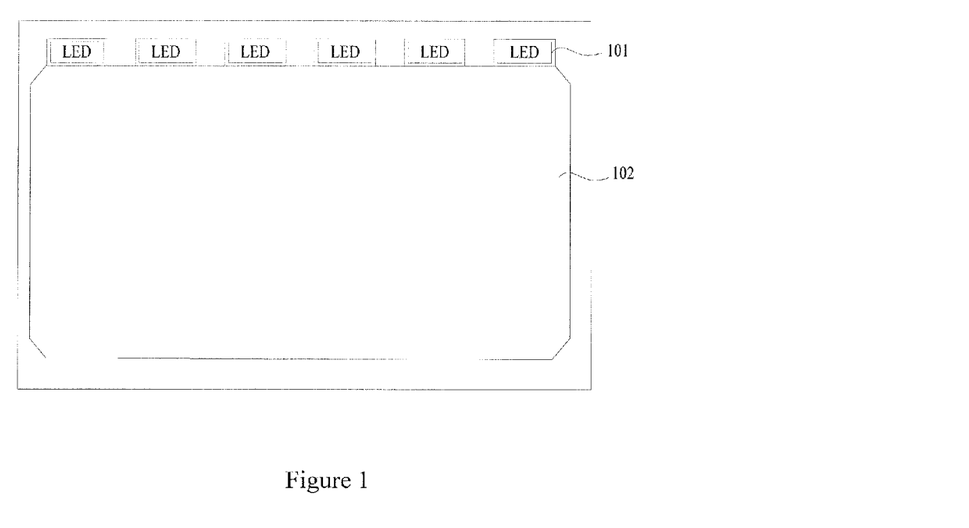
FIG. 1 is a schematic view of an edge-lighting type backlight module in the prior art.

In a conventional backlight module, for example, in an edge-lighting type backlight module, referring to FIG. 1, when light emitted by a light emitting diode (LED) 101 enter into a light guide plate 102, the light is retro-reflected multiple times within the light guide plate, and a portion of light is changed in wavelength during the procedure, which is converted from visible light into near-infrared light or infrared light, that is, the light is red-shifted. During the visible light converted into near-infrared light, some of the light energy is lost, and the converted near-infrared light is finally converted into heat energy which is dissipated. Since the converted near-infrared light produces some heat energy, the life of an electronic device is affected when the electronic device works under relatively high temperature environment, and since a portion of the light energy is finally converted into heat energy, it reduces the lighting effect of the backlight module and affects the luminance of the light guide plate.

In conclusion, a portion of the light energy of the conventional backlight module is converted into infrared light, and the infrared light is finally converted into heat energy, which affects the life of the electronic device and reduces the lighting effect of the backlight module as well as affects the luminance of the light guide plate.

SUMMARY

The embodiments of the invention provide a backlight module and a display device to solve above problems and other problems of conventional backlight modules.

According to an aspect of the present invention, a backlight module is provided, which comprises a light source and a light conversion unit, wherein the light source and the light conversion unit are provided in a same layer, and the light conversion unit is configured to convert infrared light generated due to reflection of light from the light source into visible light.

According to an embodiment of the present invention, the light conversion unit comprises up-conversion luminescence material or a frequency doubling crystal.

According to an embodiment of the present invention, the light source comprises a plurality of spaced LED light sources.

According to an embodiment of the present invention, the light conversion unit comprises a plurality of light conversion sub-units, each of the light conversion sub-units is provided between any two of the LED light sources.

According to an embodiment of the present invention, the light conversion sub-unit is spaced in a same distance with each of the adjacent LED light sources.

According to an embodiment of the present invention, the backlight module further comprises a light guide plate, the light guide plate and the light source are provided in a same layer; the light conversion unit is provided at a light incident-side of the light guide plate and/or a non-light incident-side of the light guide plate.

According to an embodiment of the present invention, the light conversion unit has a surface, which faces the light guide plate, made into a zigzag structure, or a waveform structure, or an arch structure, or a roof structure.

According to an embodiment of the present invention, the light guide plate is matched with a surface structure of the light conversion unit facing the light guide plate.

According to an embodiment of the present invention, the light conversion unit comprises a frequency doubling crystal. The frequency doubling crystal includes fluorescent powders for mixing the visible light converted by the frequency doubling crystal to form white light in the direction toward the surface of the light guide plate, or the LED light source contains fluorescent powders so that visible light emitted by the LED light source can be mixed with the visible light converted by the frequency coupling crystal to form white light.

According to an embodiment of the present invention, the light conversion unit includes a light-shielding material on the surface which does not face the light guide plate.

According to another aspect of the present invention, a display device is provided, which comprises any of the backlight modules provided by the embodiments of the present invention.

BRIEF DESCRIPTION OF THE DRAWINGS

Embodiments of the present invention will be described in detail hereinafter in conjunction with accompanying drawings to allow one of ordinary skill in the art to understand the present invention more clearly, in which.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

The embodiments of the present invention provide a backlight module. The backlight module comprises a light conversion unit and a light source wherein the light conversion unit and the light source are arranged in a same layer, and the light conversion unit is configured to convert infrared light generated due to reflection of light from the light source into visible light.

The light conversion unit includes but not limited to one of the following materials: up-converting luminescence material and a frequency doubling crystal.

The up-converting luminescence material is mainly solid compounds doped with rare earth elements, which can absorb multiple low-energy long wave radiation by utilizing the metastable level characteristics of the rare earth elements so that the invisible infrared light is converted into visible light. The up-converting luminescence material can be fluoride compound material, halide material, oxide material, sulfur compound material or the like. The above up-converting luminescence material can be $NaYF_4$:Er, Yb, wherein $NaYF_4$ is host material, when ytterbium and erbium are co-doped, erbium (Er) is used as an activator, ytterbium (Yb) is used as a sensitizer; $Y_2O_2S$:Yb, Er; $Y_2O_3$:Er3, Yb3; or the like.

The frequency doubling crystal is configured to convert infrared light and a near-infrared light into visible light. The frequency doubling crystal includes but not limited to a crystal of ammonium dihydrogen phosphate (ADP), potassium dihydrogen phosphate (KDP), potassium dideuterium phosphate (DKDP), cesium dideuterium arsenate (DCDA), cesium dihydrogen arsenate (CDA), barium metaborate (BBO), lithium triborate (LBO), or the like.

According to the position of the light source arranged in a backlight module, the backlight module can be classified into an edge-lighting type backlight module, a direct type backlight module and a corner type backlight module or the like. In the art, the edge-lighting type backlight module and the direct type backlight module are usually used. The two kinds of backlight modules will be described hereinafter, but they are only a part of illustrative embodiments.

Edge-lighting Type Backlight Module

The edge-lighting type backlight module comprises a light source arranged at side edge, and the edge-lighting type backlight module further comprises a light guide plate, wherein the light guide plate and the light source are arranged in a same layer, and a light conversion unit is arranged at a light incident-side of the light guide plate and/or a non-light incident-side of the light guide plate. The following description will illustrate the embodiments of using a frequency doubling crystal as the light conversion unit and using a LED as the light source, and the light conversion units in other embodiments are similar, which will not be redundantly described herein.

Figure 2A:
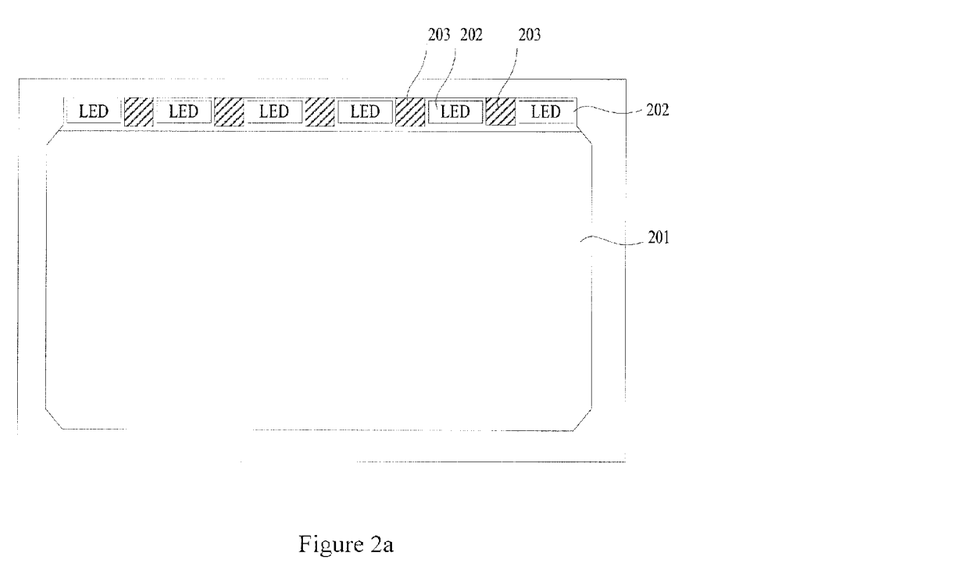
FIG. 2a is a schematic view of the edge-lighting type backlight module with a frequency doubling crystal arranged at a light incident-side of a light guide plate.
Figure 2B:
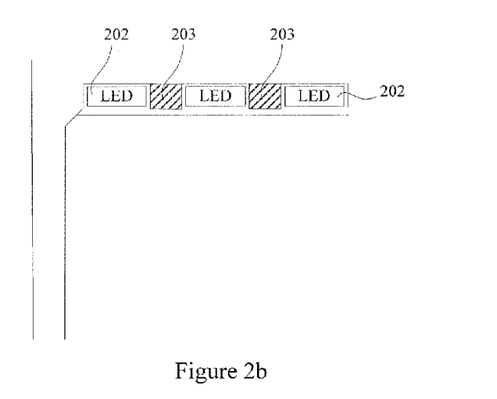
FIG. 2b is a partial enlargement view of the edge-lighting type backlight module with a frequency doubling crystal arranged at light incident-side of the light guide plate.

FIG. 2a is an edge-lighting type backlight module with a frequency doubling crystal arranged at a light incident-side of the light guide plate according to an embodiment of the present invention; FIG. 2b is a partial enlargement view of the edge-lighting type backlight module with a frequency doubling crystal arranged at a light incident-side of the light guide plate according to an embodiment of the present invention. The light incident-side of the light guide plate is a side of the light guide plate 201 facing the LED light source 202, the frequency doubling crystal 203 is arranged between any two LED light sources 202.

At least one frequency doubling crystal 203 is arranged between any two LED light sources 202. The arranged frequency doubling crystal 203 has a volume which is not more than the space between the two LED light sources 202. For example, one frequency doubling crystal 203 is arranged between two LED light sources 202, the volume of the frequency doubling crystal 203 is equal to or slightly less than the space between the two LED light sources 202. The frequency doubling crystal 203 has a height which is not higher than the height of the LED light source 202.

For mixing visible light converted by the frequency doubling crystal 203 to form white light, a surface of the frequency doubling crystal 203 facing the light guide plate 201 is coated with fluorescent powders; or if the LED light source 202 contains a material of fluorescent powders, the content of the fluorescent powders contained in the LED light source 202 is adjusted so that visible light emitted by the LED light source can be mixed with the visible light converted by the frequency coupling crystal to form white light. For example, the LED light source emits a red light or the light becomes a red light after passing through the fluorescent powders, and the visible light converted by the frequency doubling crystal is a green light, which are mixed to form white light.

It should be noted that a KDP crystal is used as the frequency doubling crystal in the present embodiment. The KDP crystal converts the absorbed infrared light into a visible green light. The surface of the KDP crystal is coated with a layer of RB fluorescent powders. The visible light emitted by the LED light source and the visible green light converted by the KDP crystal are mixed to form white light. The amount of RB fluorescent powders contained in the LED light source is adjusted so that visible light emitted by the LED light source is mixed with the visible green light converted by the KDP crystal to form white light.

It should be noted that the LED light source is used as a light source in the present embodiment, but other light sources usually used in the backlight module can be used, such as a cold cathode fluorescent lamp (CCFL), and the present invention is not limited to it.

For example, a surface of the frequency doubling frequency 203 can be coated with a layer of light-shielding material to prevent the frequency doubling crystal 203 leaking light and concentrate the output light of the frequency doubling crystal 203, wherein the surface of the frequency doubling crystal 203 that is coated with a light-shielding material does not involve the surface facing the light guide plate. The light-shielding material can be, for example, black carbon material or black metal oxide material.

Figure 2C:
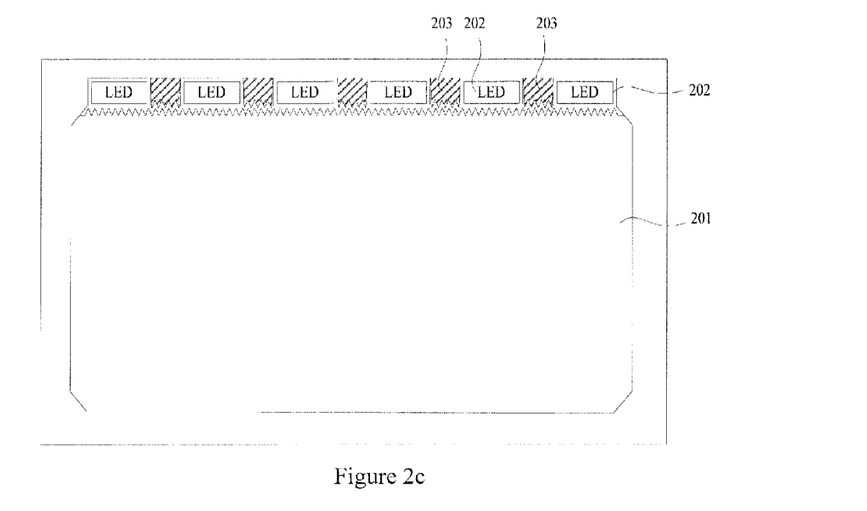
FIG. 2c is a schematic view of a edge-lighting type backlight module with a frequency doubling crystal having a zigzag structure of surface facing a light guide plate according to an embodiment of the present invention.
Figure 2D:
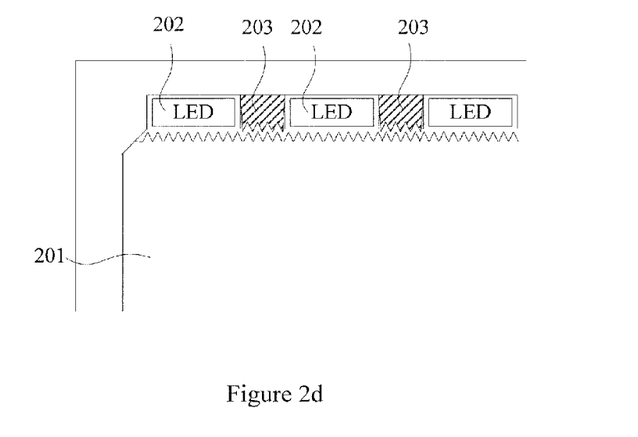
FIG. 2d is a partial enlargement view of the edge-lighting type backlight module with a frequency doubling crystal having the zigzag structure of surface facing the light guide plate according to an embodiment of the present invention.

In order to facilitate the frequency doubling crystal 203 outputting light, the surface of the frequency doubling crystal 203, which faces the light guide plate 201, is made into a zigzag structure, a waveform structure, an arch structure or a roof structure. FIG. 2c shows an edge-lighting type backlight module with a frequency doubling crystal 203 having a surface, which faces the light guide plate 201, made into a zigzag structure according to an embodiment of the present invention. FIG. 2d is a partial enlargement view of the edge-lighting type backlight module with a frequency doubling crystal having a surface, which faces the light guide plate, made into a zigzag structure. For example, the light guide plate 201 is matched with a surface of the frequency doubling crystal 203 facing the light guide plate 201, the surface structure of the light guide plate 201 and the surface structure of the frequency doubling crystal 203 have a same period length.

Figure 3A:
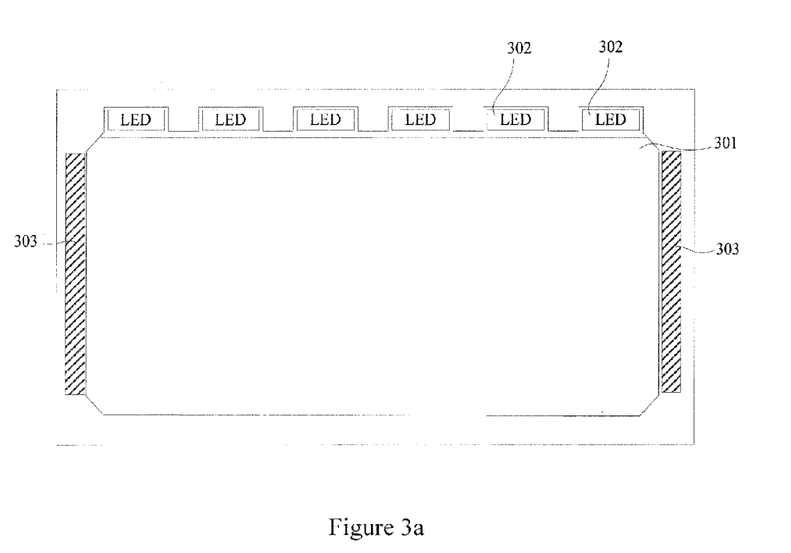
FIG. 3a is a schematic view of the edge-lighting type backlight module with a frequency doubling crystal arranged at a non-light incident-side of the light guide plate according to an embodiment of the present invention.
Figure 3B:
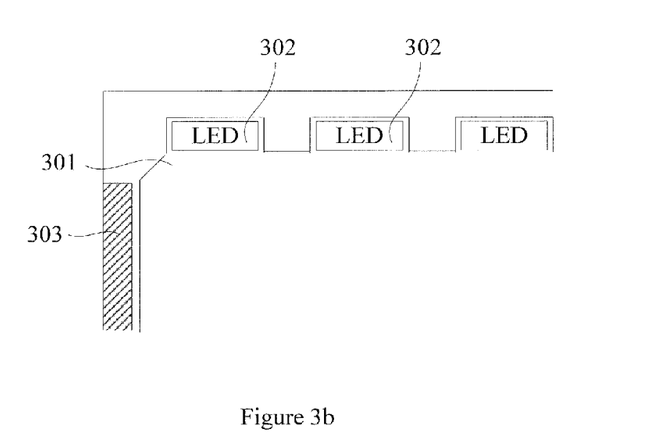
FIG. 3b is a partial enlargement view of the edge-lighting type backlight module with the frequency doubling crystal arranged at a non-light incident-side of the light guide plate according to an embodiment of the present invention.

FIG. 3a is an edge-lighting type backlight module with a frequency doubling crystal arranged at a non-light incident-side of the light guide plate according to an embodiment of the present invention; FIG. 3b is a partial enlargement view of the edge-lighting type backlight module with the frequency doubling crystal arranged at a non-light incident-side of the light guide plate according to an embodiment of the present invention. The non-light incident-side of the light guide plate 301 refers to the other three sides of the light guide plate 301 which are not facing the LED light source, and the frequency doubling crystal 303 can be arranged at one non-light incident-side of the light guide plate 301, or two non-light incident-sides of the light guide plate 301, or three non-light incident-sides of the light guide plate 301.

There may have a plurality of frequency doubling crystals 303 at one non-light incident-side of the light guide plate 301, and the frequency doubling crystal 303 has a length which is not longer than the length of the non-light incident-sides of the light guide plate 301. For example, one frequency doubling crystal 303 can be attached to one non-light incident-side of the light guide plate 301 in a form of a strip, and the length of the frequency doubling crystal 303 is the same as that of the non-light incident-side of the light guide plate 301.

For mixing visible light converted by the frequency doubling crystal 303 to form white light, the surface of the frequency doubling crystal 303 facing the light guide plate 301 is coated with fluorescent powders, or the content of the fluorescent powders contained in the LED light source 302 is adjusted, so that the visible light emitted by the LED light source can be mixed with the visible light converted by the frequency coupling crystal to form white light. For example, the surface of the frequency doubling frequency 303 can be coated with a layer of light-shielding material to prevent the frequency doubling crystal 303 leaking light and concentrate the output light of the frequency doubling crystal 303; wherein the surface of the frequency doubling crystal 303 that is coated with a light-shielding material does not involve the surface facing the light guide plate.

Figure 3C:
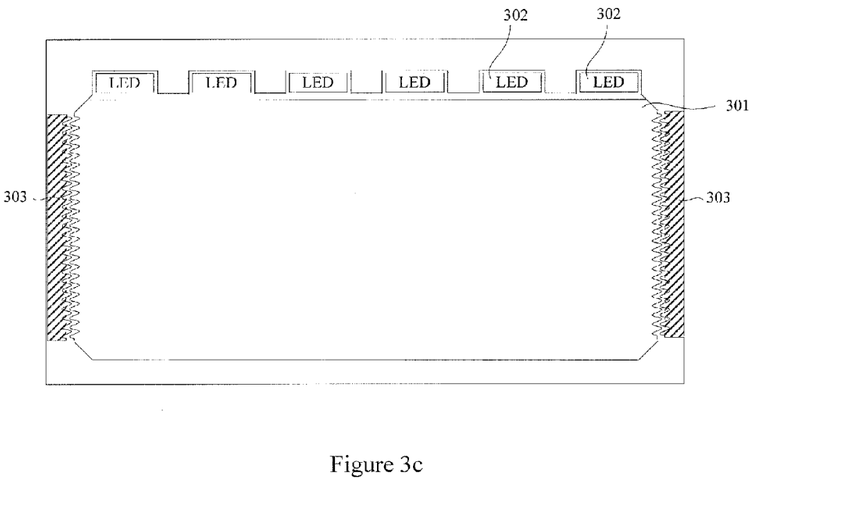
FIG. 3c is a schematic view of the edge-lighting type backlight module with a frequency doubling crystal having a waveform structure of surface facing the light guide plate according to an embodiment of the present invention.
Figure 3D:
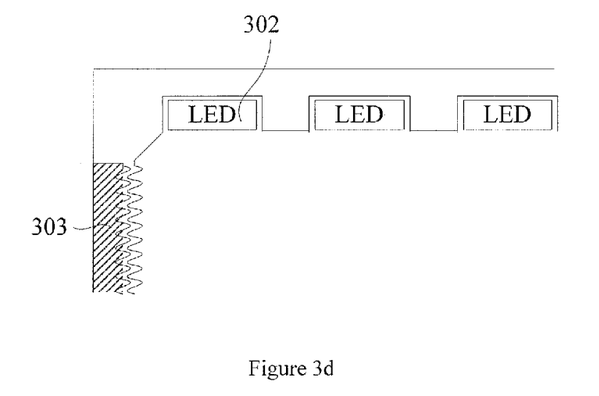
FIG. 3d is a partial enlargement view of the edge-lighting type backlight module with a frequency doubling crystal having the waveform structure of surface facing the light guide plate according to an embodiment of the present invention.

In order to facilitate the frequency doubling crystal 303 outputting light, the surface of the frequency doubling crystal 303, which faces the light guide plate 301, can be made into a zigzag structure, a waveform structure, an arch structure or a roof structure. FIG. 3c shows an edge-lighting type backlight module having a surface of the frequency doubling crystal, which faces the light guide plate 301, made into a waveform structure; FIG. 3d is a partial enlargement view of the edge-lighting type backlight module with the surface of the frequency doubling crystal facing the light guide plate 301 made into a waveform structure. For example, the light guide plate 301 can be matched with a surface of the frequency doubling crystal 303 facing the light guide plate 301, and the surface structure of the light guide plate 301 and the surface structure of the frequency doubling crystal 303 have a same period length.

Figure 4:
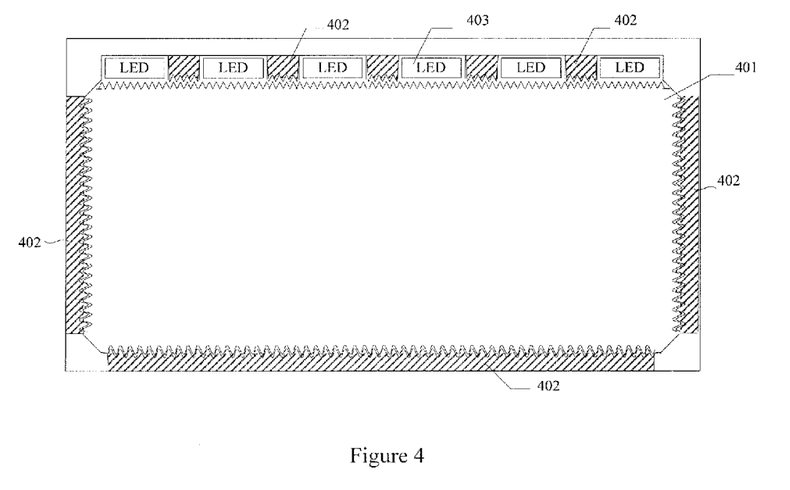
FIG. 4 is a schematic view of the edge-lighting type backlight module with a frequency doubling crystal arranged at a light incident-side and a non-light incident-side of the light guide plate according to an embodiment of the present invention.

FIG. 4 shows an edge-lighting type backlight module with a frequency doubling crystal arranged at a light incident-side and a non-light incident-side of the light guide plate, wherein the frequency doubling crystal 402 arranged at the light incident-side of the light guide plate 401 can be arranged between any two LED light sources 403, and the frequency doubling crystal 402 arranged at the non-light incident-side of the light guide plate 401 can be attached to a side edge of the light guide plate in a form of a strip.

For the frequency doubling crystal 402 arranged at the light incident-side of the light guide plate 401, at least one frequency doubling crystal 402 may be arranged between any two LED light sources 403. The arranged frequency doubling crystal has a volume which is not more than the space between the two LED light sources 403. For example, one frequency doubling crystal 402 is arranged between two LED light sources 403, and the volume of the frequency doubling crystal 402 is equal to or slightly less than the space between the two LED light sources 403. The frequency doubling crystal 402 has a height which is not higher than the height of the LED light source 403.

The frequency doubling crystal 402 arranged at the non-light incident-side of the light guide plate 401 can be arranged in at least one of non-light incident-sides of the light guide plate 401. A plurality of frequency doubling crystals 402 can be arranged at one non-light incident-side of the light guide plate 401, and the frequency doubling crystal 402 has a length which is not longer than the length of the non-light incident-sides of the light guide plate 401. For example, one frequency doubling crystal 402 is attached to one non-light incident-side of the light guide plate 401, and the length of the frequency doubling crystal 402 is the same as that of the non-light incident-side of the light guide plate 401.

For mixing visible light converted by the frequency doubling crystal 402 to form white light, the surface of the frequency doubling crystal 402 facing the light guide plate 401 can be coated with fluorescent powders; or the content of the fluorescent powders contained in the LED light source 403 is adjusted so that visible light emitted by the LED light source can be mixed with the visible light converted by the frequency coupling crystal to form white light. For example, the surface of the frequency doubling frequency 402 can be coated with a layer of light-shielding material to prevent the frequency doubling crystal 402 leaking light and concentrate the output light of the frequency doubling crystal 402. The surface of the frequency doubling crystal 402 that is coated with a light-shielding material does not involve the surface facing the light guide plate.

In order to facilitate the frequency doubling crystal 402 outputting light, the surface of the frequency doubling crystal 402, which faces the light guide plate 401, is made into a zigzag structure, a waveform structure, an arch structure or a roof structure. For example, the light guide plate 401 can be matched with a surface of the frequency doubling crystal 402 facing the light guide plate 401, and the surface structure of the light guide plate 401 and the surface structure of the frequency doubling crystal 402 have a same period length.

Direct Type Backlight Module

The LED light source does not overlap with the light conversion unit.

Figure 5:
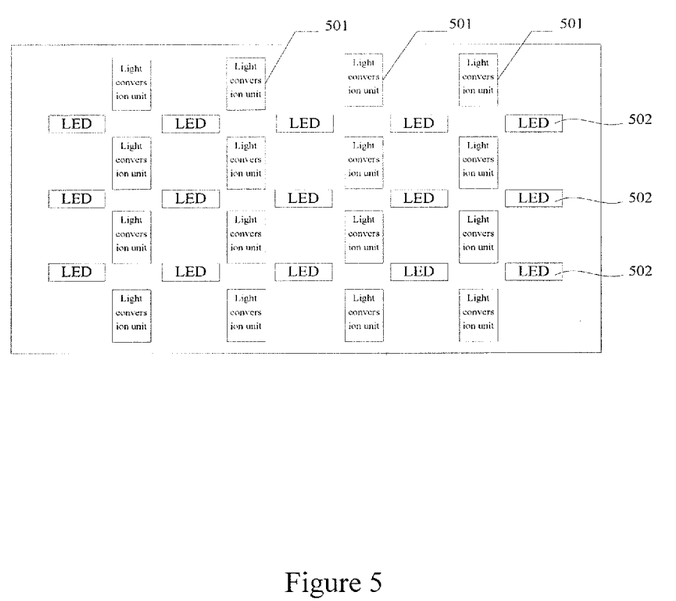
FIG. 5 is a front view of a direct type backlight module according to an embodiment of the present invention.

The light conversion unit can be arranged in any position which is not covered by the LED light source. For example, as shown in FIG. 5, the light conversion units 501 are distributed in the spaces of the LED light source 502 in an array, and are adjacent to at least two LED light sources 502. The light conversion units 501 is spaced a same distance from the adjacent LED light sources 502, and the height of the light conversion unit 501 is not higher than the height of the LED light source 502.

For mixing visible light converted by the light conversion unit 501 to form white light, the out-light surface of the light conversion unit 501 is coated with fluorescent powders; wherein the out-light surface of the light conversion unit 501 is in the same direction as that of the LED light source 502, or the content of fluorescent powders contained in the LED light source 502 is adjusted so that visible light emitted by the LED light source can be mixed with the visible light converted by the frequency coupling crystal to form white light.

For example, the surface of the light conversion unit 501 can be coated with a layer of light-shielding material to prevent the light conversion unit 501 leaking light and concentrate the output light of the light conversion unit 501; wherein the surface of the light conversion unit 501 that is coated with the light-shielding material does not involve the out-light surface of the light conversion unit 501.

In order to facilitate the light conversion unit 501 outputting light, the out-light surface of the light conversion unit 501 is made into a zigzag structure, a waveform structure, an arch structure or a roof structure.

According to embodiments of the present invention, a display device is provided, which comprises any one of backlight modules provided in the embodiments of the present invention.

The display device provided in the embodiments of the present invention can be a liquid crystal display television, a liquid crystal display, a digital photo frame, a cell phone, a tablet computer or other any product or device required the display function of the backlight module, but the present invention is not limited thereto.

The backlight module provided according to the embodiments of the present invention comprises a light conversion unit and a light source arranged in a same layer, wherein the light conversion unit is configured to convert infrared light generated due to reflection of light from the light source into visible light. In such a way, it can be avoided that the visible light emitted by the backlight module is converted into infrared light due to multiple reflections, and the infrared light is finally converted into heat energy, which affects the life of the electronic device and reduces the lighting effect of the backlight module. The light conversion unit converts the absorbed infrared light into visible light, which reduces the heat loss caused by the visible light being converted into infrared light and finally converted into heat energy, and improves the lighting effect of the backlight module.

It is apparent that those skilled in the art can make various variations and modifications to the present invention without departure from the spirit and the scope of the present invention, and the present invention is intended to include such variations and modifications and equivalents thereof fall in the scope of the claims of the present invention.

The is claimed is:

1. A backlight module, comprising:
   a light source; and
   a light conversion unit;
   wherein the light conversion unit and the light source are provided in a same layer, and the light conversion unit is configured to convert infrared light generated due to reflection of light from the light source into visible light, and
   in a case that the light conversion unit and the light source are provided in the same layer, the light source does not overlap with the light conversion unit;
   wherein visible light directly emitted by the light source is mixed with the visible light converted by the light conversion unit to form white light.

2. The backlight module according to claim 1, wherein the light conversion unit comprises an up-converting luminescence material or a frequency doubling crystal.

3. The backlight module according to claim 2, wherein the light source comprises a plurality of spaced LED light sources.

4. The backlight module according to claim 2, further comprising a light guide plate, wherein the light guide plate and the light source are provided in a same layer, and the light conversion unit is provided at a light incident-side and/or a non light incident-side of the light guide plate.

5. The backlight module according to claim 3, further comprising a light guide plate, wherein the light guide plate and the light source are provided in a same layer, and the light conversion unit is provided at a light incident-side and/or a non light incident-side of the light guide plate.

6. The backlight module according to claim 1, wherein the light source comprises a plurality of spaced LED light sources.

7. The backlight module according to claim 6, wherein the light conversion unit comprises a plurality of light conversion sub-units, and each of the light conversion sub-units is provided between any two of the LED light sources.

8. The backlight module according to claim 7, wherein each of the light conversion sub-units is spaced at a same distance from each adjacent LED light source.

9. The backlight module according to claim 6, further comprising a light guide plate, wherein the light guide plate and the light source are provided in a same layer, and the light conversion unit is provided at a light incident-side and/or a non light incident-side of the light guide plate.

10. The backlight module according to claim 7, further comprising a light guide plate, wherein the light guide plate and the light source are provided in a same layer, and the light conversion unit is provided at a light incident-side and/or a non light incident-side of the light guide plate.

11. The backlight module according to claim 1, further comprising a light guide plate, wherein the light guide plate and the light source are provided in a same layer, and the light conversion unit is provided at a light incident-side and/or a non-light incident-side of the light guide plate.

12. The backlight module according to claim 11, wherein the light conversion unit comprises a surface facing the light guide plate, which surface is made into a zigzag structure, or a waveform structure, or an arch structure, or a roof structure.

13. The backlight module according to claim 12, wherein the light guide plate is matched with a surface structure of the light conversion unit facing the light guide plate.

14. The backlight module according to claim 12, wherein the light conversion unit is made of a material of a frequency doubling crystal, a surface of the frequency doubling crystal facing the light guide plate includes fluorescent powders for mixing the visible light converted by the frequency doubling crystal with the visible light emitted by the light source to form white light, or the light source contains fluorescent powders so that the visible light emitted by the light source is mixed with the visible light converted by the frequency coupling crystal to form white light.

15. The backlight module according to claim 12, wherein a surface of the light conversion unit, which does not face the light guide plate, includes a light-shielding material.

16. The backlight module according to claim 11, wherein the light guide plate is matched with a surface structure of the light conversion unit facing the light guide plate.

17. The backlight module according to claim 16, wherein the light conversion unit is made of a material of a frequency doubling crystal, a surface of the frequency doubling crystal facing the light guide plate includes fluorescent powders for mixing the visible light converted by the frequency doubling crystal with the visible light emitted by the light source to form white light, or the light source contains fluorescent powders so that the visible light emitted by the light source is mixed with the visible light converted by the frequency coupling crystal to form white light.

18. The backlight module according to claim 11, wherein a material of the light conversion unit comprises a frequency doubling crystal, a surface of the frequency doubling crystal facing the light guide plate includes fluorescent powders for mixing the visible light converted by the frequency doubling crystal with the visible light emitted by the light source to form white light, or the light source contains fluorescent powders so that the visible light emitted by the light source is mixed with the visible light converted by the frequency coupling crystal to form white light.

19. The backlight module according to claim 11, wherein a surface of the light conversion unit, which does not face the light guide plate, includes a light-shielding material.

20. A display device, comprising the backlight module according to claim 1.

* * * * *